United States Patent Office 3,388,100
Patented June 11, 1968

3,388,100
POLYURETHANE POLYMERS CONTAINING
AMIDE AND UREA GROUPS
Wilhelm Thoma, Cologne-Flittard, and Heinrich Rinke, Leverkusen, Germany, assignors to Farbenfabriken Bayer Aktiengesellschaft, Leverkusen, Germany, a German corporation
No Drawing. Filed July 22, 1964, Ser. No. 384,522
Claims priority, application Germany, July 24, 1963, F 40,330
8 Claims. (Cl. 260—75)

This invention relates to polyurethane polymers and to a method of preparing the same. More particularly, the invention relates to highly elastic polyurethane polymers having a high terminal strength, high moduli, high melting and softening points which are suitable for fabrication into fibers and foils.

It has been heretofore known to react substantially linear, high molecular weight polyhydroxyl compounds with polyisocyanates and glycols as chain lengthening agents and to produce molded articles therefrom, e.g., gear wheels, seals and plates, by the so-called casting or cast molding process.

It has also been heretofore known in German patent specifications 955,995 and 961,572 to use relatively low melting diol amides, e.g., adipic acid dioxyethylamide (M.P. 130°), diol urethanes, e.g., 1,6-hexamethylenedioxyethylurethane (M.P. 97°) and diol ureas e.g. dioxyethylurea (M.P. 83°) as chain lengthening agents. The reaction of these chain lengthening agents with the preadducts of polyhydroxyl compounds and polyisocyanates, which contain NCO end groups, is also carried out in the melt.

It is further known to dissolve such elastomers in suitable solvents, e.g. in dimethylformamide at elevated temperature. The solution process is based on a more or less strong degradation of the cross-linked elastomers. From such solutions which contain degraded products, it is hardly possible to produce threads and foils with uniform and reproducible properties, since the degradation cannot be controlled.

The reaction between reaction products of polyhydroxyl compounds and polyisocyanate (NCO preadducts) and aliphatic glycols in polyacrylonitrile solvents such as dimethylformamide is mentioned in German patent specification 888,766.

However, German patent specification 1,112,041 discloses that isocyanates in dimethylformamide partly react with dimethylformamide themselves at elevated temperature (100°) and thus are no longer available for the formation of high molecular weight compounds. Therefore, according to the said patent specification, the main reaction of the NCO preadducts with glycols is carried out in inert solvents, e.g. methylethylketone, with the addition of catalysts, and the reaction does not go to completion in the presence of dimethylformamide until the second reaction phase. However, the elastomers obtained from NCO preadducts and aliphatic glycols both in dimethylformamide and in inert solvents plus dimethylformamide have only relatively low tear strength as films and fibers, and low tensile strengths at elongations up to e.g., 300%.

Moreover, tensile strengths are dependent to a considerable extent upon temperature, i.e., they decrease rapidly with increasing temperature. On the whole, these threads and foils show a fairly marked thermoplastic behavior.

It is therefore an object of this invention to provide improved polyurethane polymers. It is another object of this invention to provide a method for preparing improved polyurethane polymers. It is still another object of this invention to provide polyurethane polymers suitable for fabrication into foils and fibers. It is a further object of this invention to provide polyurethane polymers suitable for fabrication into threads and foils having high tear strength, high moduli and high melting and softening points. It is a further object of this invention to provide polyurethane polymers which can be produced in solution without the use of catalysts.

The foregoing objects and others which will become apparent from the following description are accomplished in accordance with the invention generally speaking by providing polyurethane polymers by reacting a substantially linear compound having active hydrogen atoms as determined by the Zerewitinoff test, which active hydrogen atoms are reactive with isocyanate groups and an excess of an organic polyisocyanate with a chain-extending agent having a melting point of at least about 160° C. and having one of the following formulas (I) HO—$R_1$—CO—NH—R—NH—CO—$R_1$—OH (II) HO—$R_1$—NH—CO—R—CO—NH—$R_1$—OH (III) HO—$R_1$—NH—CO—NH—R—
NH—CO—NH—$R_1$—OH (IV) HO—$R_1$—NH—CO—NH—
NH—CO—NH—$R_1$—OH wherein R is a divalent organic radical which may or may not be interrupted by oxygen, nitrogen, or sulfur atoms and $R_1$ is a divalent aliphatic, hydroaromatic or arylaliphatic radical where the hydroxyl group is attached to the aliphatic portion, the reaction being conducted in a highly polar solvent which will dissolve polyacrylonitrile. Thus, the invention contemplates the preparation of polyurethane polymers in a highly polar solvent wherein one of the chain-extending agents set forth above is used in place of the customarily used chain-extending agents.

R may be any suitable divalent organic radical such as, aliphatic, hydroaromatic, arylaliphatic or aromatic such as, for example, methylene, ethylene, propylene, tetramethylene, hexamethylene, 1,4-phenylene, 1,3-phenylene, 1,4-cyclohexylene, 2,4-tolylene, 2,5-tolylene, 2,6-tolylene, 3,5-tolylene, 4-chloro-1,3-phenylene, 1-methoxy-2,4-phenylene, 1-methyl-3,5-diethyl-2,6-phenylene, 1,3,5-triethyl-2,4 - phenylene, 1 - methyl - 3,5 - diethyl - 2,4 - phenylene, 1-methyl-3,5-diethyl-6-chloro - 2,4 - phenylene, 6-methyl-2,4-diethyl-5-nitro-1,3-phenylene, p-xylylene, m-xylylene, 1-methyl-2,4-cyclohexylene, 4,4'-biphenylene, 3,3'-dimethyl-4,4'-biphenylene, 3,3'-dimethoxy-4,4'-biphenylene, 3,3'-diethoxy - 4,4' - biphenylene, 1,5-naphthylene, isopropyl, allyl, butyl, isobutyl, sec.butyl, tert.butyl, amyl, 3-methoxypropyl, tetradecyl, chlorodecyl, 4 - oxa - hexadecyl, 4-oxa-6-butyldodecyl, dodecyl, hexadecyl, octadecyl, 1-isocyanato-octadecene-9, o-ethylphenyl, o-ethoxyphenyl, p-ethoxyphenyl, o-nitrophenyl, m-nitrophenyl, p-nitrophenyl, benzyl, 2,4-dichlorophenyl, 3,4-dichlorophenyl, 2,5-dichlorophenyl, o-phenoxyphenyl, 3-nitro-4- chlorophenyl, cyclopropyl, cyclobutyl, cycloamyl, cyclohexyl, cycloheptyl, cyclooctyl, cyclononyl, cyclodecyl, cycloundecyl, cyclododecyl, cylcotridecyl, cyclotetradecyl, cyclopentadecyl, cyclohexadecyl, cycloheptadecyl, cyclooctadecyl, cyclononedecyl, cycloeicosyl and the like.

$R_1$ may be any of the aliphatic, hydroaromatic or arylaliphatic radicals set forth above for R.

It is required, in order to conduct the process in accordance with this invention, to utilize a suitable polar solvent due to the high melting temperatures of the chain-extending agents used. The temperatures required for melting these chain-extending agents would lead to early and extensive swelling of the reaction masses if reaction is continued in the melt. An advantage using the chain-extending agents set forth above for the preparation of polymers suitable for fabrication into highly elastic fibers and foils is that the reaction can be conducted in a suitable solvent without the need of any catalyst. By using chain-extending agents within any of the formulas set forth above, highly elastic fibers and foils having high tear strength, high moduli and high melting and softening points are prepared. The products resulting are also advantageous when compared with those made utilizing simple glycols such as butanediol as the chain-extending agent in that they exhibit considerably reduced or practically no thermoplasticity.

Any suitable substantially linear organic compound containing active hydrogen atoms may be used in the process of this invention such as, for example, dihydroxyl polyesters, polyalkylene ether glycols, dihydric polythioethers, dihydric polyacetals and the like.

Any suitable dihydroxyl polyester may be used such as, for example, the reaction product of a dicarboxylic acid and a dihydric alcohol. Any suitable dicarboxylic acid may be used in the preparation of the hydroxyl polyester such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable dihydric alcohol may be used in the reaction with the dicarboxylic acid to form a polyester such as, for example, ethylene glycol, propylene glycol, butylene glycol, amylene glycol, hexanediol, xylylene glycol, neopentyl glycol, bis(hydroxy-methylcyclohexane) and the like. Of course, the hydroxyl polyester may contain urethane groups, urea groups, amide groups, chalkogen groups and the like. Thus, the hydroxyl terminated polyester includes in addition to hydroxyl terminated polyesters, also hydroxyl terminated polyester amides, polyester urethanes, polyetheresters, and the like. Any suitable polyester amide may be used such as, for example, the reaction product of an amino alcohol with any of the compositions set forth for preparing polyesters. Any suitable amine may be used such as, for example, ethylene diamine, propylene diamine, tolylene diamine and the like. Any suitable amino alcohol such as, for example, β-hydroxy ethylamine and the like may be used. Any suitable polyester urethane may be used such as, for example, the reaction of any of the above mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid such as those mentioned above, with relation to the preparation of polyesters. Any suitable ether glycol may be used such as, for example, diethylene glycol, triethylene glycol, 1,4-phenylene-bis-hydroxy ethyl ethers, 2,2'-diphenylpropane 4,4'-bis-hydroxy ethyl ether and the like.

Any suitable polyalkylene ether glycol may be used such as, for example, the condensation product of an alkylene oxide with a small amount of a compound containing active hydrogen containing groups such as, for example, water, ethylene glycol, propylene glycol, butylene glycol, amylene glycol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the Encyclopedia of Chemical Technology, Volume 7, pages 257–262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4' - dihydroxy butyl sulfide, 1,4 - (β-hydroxy ethyl)phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

The organic compound containing active hydrogen atoms should preferably have a molecular weight of from about 500 to about 5000 and an hydroxyl number of from about 25 to about 250.

Any suitable organic diisocyanate may be used in the practice of this invention such as, for example, ethylene diisocyanate, ethylidene diisocyanate, propylene diisocyanate, butylene diisocyanate, hexamethylene diisocyanate, cyclopentylene-1,3-diisocyanate, cyclohexylene-1,4-diisocyanate, cyclohexylene-1,2-diisocyanate, 2,4-toluylene diisocyanate, 2,6-toluylene diisocyanate, dimeric toluylene diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl - 4,4'-diisocyanate, azobenzene-4,4'-diisocyanate, diphenylsulphone - 4,4'-diisocyanate, dichlorohexamethylene diisocyanate, furfurylidene diisocyanate, 1-chlorobenzene-2,4-diisocyanate and the like. It is preferred that aromatic diisocyanates be used and for best results, 4,4'-diphenylmethane diisocyanate or toluylene diisocyanate have proven to be especially suitable.

Any suitable compound having a melting point of at least 160° C. within one of the four formulas represented above may be used as the chain-lengthening agent in accordance with this invention. The diolamides within Formula I represented above may be prepared by reacting suitable organic diamines with hydroxy carboxylic acid esters or lactones. Any suitable diamine may be used such as, for example, ethylene diamine, propylene diamine, hexamethylene diamine, butylene diamine, pentamethylene diamine, p-phenylene diamine, m-phenylene diamine, 1,4-diaminocyclohexane, 2,4 - diaminotoluene, 2,5-diaminotoluene, 3,5-diaminotoluene, 2,6-diaminotoluene, 2,4-diamino - 1-methylcyclohexane, 1-methyl-3,5-diethyl-2,6-diaminobenzene, 1-methyl-3,5-diethyl, 2,4-diaminobenzene, 1,3,5-triethyl-2,6-diaminobenzene, m-xylylene diamine, p-xylylene diamine, 4,6-dimethyl-1,3-xylylene diamine, 1-amino-3-ethyl-(1'-amino-)benzene, 3,3'-dimethyl-4,4'-diaminodiphenyl, 3,3' - dimethoxy - 4,4'-diamino-diphenyl, 3,3'-diethoxy-4,4'-diaminodiphenyl, bis(4-aminobenzene)-1,1 - cyclohexane, 4,4'-diaminodiphenylmethane, 4,4'-diaminocyclohexylmethane, 4,4'-diaminodiphenyl dimethylmethane, 1,5-diaminonaphthylene and the like.

Any suitable hydroxy carboxylic acid may be used such as, for example, hydroxy butyric acid, hydroxy caproic acid, lactic acid, hydroxy cyclohexane carboxylic acid, hydroxy acetic acid, hydroxy formic acid, hydroxy glutamic acid, hydroxy isobutyric acid, hydroxy valeric acid and the like. Any suitable compound within the Formula I set forth above such as, for example, ethylene-dihydroxybutyric acid amide, hexamethylenedihydroxycaproic acid amide, 1,4-cyclohexanedihydroxybutyric acid amide, 1,3-xylylene-dilactic acid amide, 1,3-phenylene-dihydroxybutyric acid amide and γ, γ'-dipropyl-ether-dihydroxycyclohexane-carboxylic acid amide and the like.

Any suitable compound within Formula II may be used in accordance with this invention. Such compounds may be prepared by reacting dicarboxylic acids or their esters with amino alcohols under aminolytic conditions. Any suitable carboxylic acid may be used such as those more specifically set forth above with regard to the preparation of dihydroxy polyesters. Any suitable amino alcohol may be used such as, for example, aminoethyl alcohol, aminopropyl alcohol, aminobutyl alcohol, aminoisobutyl alcohol, aminohexyl alcohol and the like. Specific compounds within Formula II set forth above include compounds such as, for example, oxalic acid dihydroxyethylamide, adipic acid dihydroxyethylamide, 1,4-cyclohexane-dicarboxylic acid dihydroxypropylamide, terephthalic or isophthalic acid dihydroxycyclohexylamide and the like.

Any suitable hydroxyurea having the Formula III may be used such as compounds prepared from organic diisocyanates, compounds fissionable to diisocyanates and aminoalcohols at low temperatures in solvent. Any suitable diisocyanate or amino alcohol such as those set forth above may be used to prepare such hydroxyureas. Any compound within Formula III such as hexamethylene-dihydroxy ethyl urea, diphenylmethane-4,4'-dihydroxycyclohexylurea, phenylene-1,4-dihydroxypropylurea and cyclohexane-1,4-dihydroxy cyclohexylurea and the like may be used.

Any suitable compound within Formula IV above may be prepared by reacting hydrazodicarboxylic acids or their esters particularly the diphenyl esters with aminoalcohols. Any suitable aminoalcohol such as those more particularly set forth above may be used. Any specific compound within Formula IV as set forth above may be used such as, for example, hydrazodicarboxylic acid dihydroxyethylamide, hydrazodicarboxylic acid hydroxypropylamide, hydrazodicarboxylic acid di-3-hydroxybutylamide and the like.

Elastomer solutions may be prepared as follows: 1.0 mol of a substantially, high molecular weight polyhydroxyl compound is reacted in known manner in the molten state with 1.5 to 3.5 mols of a diisocyanate at 80° C. to 150° C., preferably 90° C. to 120° C. The NCO preadduct thereby formed is dissolved in so-called polyacrylonitrile solvents, e.g. dimethylformamide, dimethylacetamide, N-methylpyrrolidone or dimethylsulphoxide and the like and then reacted with 0.5 to 2.5 mols., preferably 0.3 to 2.3 mols of a chain lengthening agent (I) to (IV) at 50° C. to 120° C., preferably at 60° C. to 80° C.

Solvents such as methyl ethyl ketone, dioxane, tetrahydrofuran or chlorobenzene may be used in addition to polyacrylonitrile solvents. The chain lengthening agent may be reacted either as solid or in solution with the preadduct solution.

The chain lengthening agent should preferably be used in less than the quantity calculated on the NCO groups present, since a certain quantity of these NCO groups are required for branching reactions at the urethane-, amide- and urea groups and because, owing to the reactivity of dimethylformamide with NCO groups, which has already been mentioned above, a quantity of NCO groups which cannot be calculated accurately withdraws from the required polyaddition reaction. The excess of diisocyanate should be at least 0.1 mol.

The elastomers may be formed from solution by known processes, e.g. by dry spinning or wet spinning or by casting the solution as films and evaporating off the solvent. The foils obtained may be cut into threads.

It is preferred to form the elastomer solution by the dry spinning process. In this process, solutions of viscosities of at least 300 p./20° are spun through spinning nozzles into a shaft heated to about 150° C. to 250° C. into which hot air or inert gases are blown at about 150° C. to 330° C., multifilament threads of low individual titers being obtained by using multiaperature nozzles. By suitably conducting the spinning process, the individual threads may come into contact with each other at the lower end of the spinning shaft or after leaving the shaft, so that an apparent monofil thread is produced which can be more or less easily broken up again into individual threads by mechanical action.

In forming the solution by a wet spinning process, the viscous solution (about 0.5 to 1000 p./20°) is spun into hot water or into solvent mixtures, e.g. aqueous solutions containing portions of dimethylformamide, dimethylsulphoxide or glycol.

For a controlled thread formation, particularly in wet spinning processes, it is sometimes an advantage if the spinning solution contains, in addition to the polar solvents such as dimethylformamide, other solvents such as dioxane, chlorobenzene, nitrobenzene, benzyl alcohol, tetrachloroethane, etc. The threads are freed from residues of solvent by intensive washing, and in some cases, by prolonged standing in hot water.

The mechanical and elastic properties of elastomer threads may be partly improved by thermal after-treatment e.g., by heating the fibers at 90 to 150° or by briefly boiling them in water. If the threads from the spinning process or threads after preliminary stretching are orientated or stretched, this orientation may be fixed by heating the spools (e.g., 6 hours at 80° or 4 hours at 100° or 1 hour at 130°), which alters the mechanical and elastic properties of the thread. Thus, depending upon the preliminary stretching, the elongation at breaking of the threads decreases slightly whereas the modulus of the threads increases greatly. The tendency of preorientated threads to shrink may also be reduced or eliminated by thermal fixation.

When threads are simultaneously cross-linked with polyethylene imide compounds and stretched by the process according to U.S. application Ser. No. 257,749, now abandoned, insoluble threads having better elastic properties, especially improved elastic recovery after stretching of the threads, are obtained with solvents such as dimethylformamide or those used for dry cleaning.

The highly viscous solutions obtained by the process according to the invention may, according to Belgian patent specification 586,958, be spun through suitable nozzles together with some other thread-forming solution, e.g., polyacrylonitrile, into dimethylformamide to form a two-component thread.

Suitable elastomer substances obtained by removing solvent (evaporation, coagulation) may also be converted into threads or foils by melt spinning processes.

The highly elastic threads obtained by spinning elastomer solutions have excellent mechanical qualities, high elastic stretch (400% to 900%), relatively high moduli of elasticity and good elastic recovery after repeated stretching. Since the threads are very abrasion-resistant, stable to oxidation and to the action of cosmetic oils, and can easily be dyed, they may advantageously be used instead of threads of vulcanized rubber for the production of rubber elastic woven fabrics of all types. Such fabrics are used particularly in the corset industry for the production of elastic bands, stocking tops, surgical hose, swimsuits and other articles.

The highly elastic polyurethane fibers may be worked up in mixtures (3%–50%) with the usual textile fibers, in which the elastomer threads may be in a highly stretched state, whereby fabrics of high elasticity, good recovery after creasing, and low pilling tendency are obtained.

In addition to the production of foils and threads, the elastomer solutions may be used for the production of coatings, e.g., on textiles. Furthermore, they may be used as auxiliary agents for finishing textiles or for fixing pigments in textile printing processes.

The invention is further illustrated but not limited by the following examples in which parts are by weight unless otherwise specified.

Example 1

About 100 parts of a polyester (reaction number 67.5) of adipic acid, hexanediol-1,6- and 2,2-dimethylpropanediol-1,3- (molar ratio 3:2) are dried for about one hour at about 130° in a water jet vacuum after the addition of about 0.1 part by volume of a 30% sulphur dioxide solution in dioxane. After cooling to about 95° C., the polyester is treated with about 30.3 parts diphenylmethane-4,4'-diisocyanate. The melt is heated for about 60 minutes to an internal temperature of about 100° C. A solution of about 18.0 parts diphenylmethane-4,4'-di-(hydroxyethyl)-urea (M.P. 230° C.) in about 220 parts dimethylformamide is then added and the reaction solution is stirred for about 120 minutes at about 80° C. After diluting the solution, which has become viscous with about 130 parts of dimethylformamide, the reaction is continued for about another 60 minutes at about 50° C. to about 60° C. and about 2.0 parts of a 10% diisobutylamine solution in dimethylformamide is finally added.

A film is cast from the 30%, highly viscous elastomer solution. The foil obtained after drying at about 70° to about 100° C. has the following properties:

| | |
|---|---|
| Thickness (mm.) | 0.1 |
| Tear strength (kg./cm.²) | 624 |
| Elongation (percent) | 520 |
| Tension at 20% elongation (kg./cm.²) | 30 |
| Tension at 300% elongation (kg./cm.²) | 243 |
| Resistance to further tearing according to Graves (kg./cm.) | 47 |
| Microhardness | 62 |

Threads cut from the foil having the following characteristics:

| | |
|---|---|
| Titer (den.) | 1185 |
| Tear strength (g./den.) | 0.71 |
| Elongation (percent) | 590 |
| Tension at 300% elongation (mg./den.) | 110 |
| Tension at 150% elongation (mg./den.) measured in a release cycle after 3 times stretching to 300% with 400%/min. | 22 |

If the NCO preadduct is reacted with about 23.1 parts diphenylmethane-4,4'-(hydroxycyclohexyl)-urea (M.P. 250° C.) instead of with diphenylmethane-4,4'-di-(hydroxyethyl)-urea under the above conditions, a viscous, slightly turbid elastomer solution is obtained. Foils made from this solution have the following properties:

| | |
|---|---|
| Thickness (mm.) | 0.20 |
| Tear strength (kg./cm.²) | 440 |
| Elongation (percent) | 475 |
| Tension at 20% elongation (kg./cm.²) | 34 |
| Tension at 300% elongation (kg./cm.²) | 145 |
| Resistance to further tearing according to Graves (kg./cm.) | 47 |
| Microhardness | 73 |

Example 2

About 100 parts of the polyester from Example 1 are reacted, as in the said example, with about 30.3 parts diphenylmethane-4,4'-diisocyanate. A solution of about 8.5 parts oxalic acid dihydroxy ethylamide (M.P. 173° C.) in about 200 parts dimethylformamide is added to the melt and the reaction mixture is left to react for about 50 minutes at about 80° C. After diluting the reaction solution, which has become viscous, with about 125 parts dimethylformamide, the reaction is taken to completion at about 60° C. Instead of oxalic acid dihydroxyethylamide, about 9.8 parts oxalic acid dihydroxypropylamide (M.P. 160° C.) may be used. A film is cast from the highly viscous 30% elastomer solution. The foil obtained after drying at about 70° C. to about 100° C. has the following properties:

| | |
|---|---|
| Thickness (mm.) | 0.16 |
| Tear strength (kg./cm.²) | 420 |
| Elongation (percent) | 550 |
| Tension at 20% elongation (kg./cm.²) | 24 |
| Tension at 300% elongation (kg./cm.²) | 117 |
| Resistance to further tearing according to Graves (kg./cm.) | 31 |
| Microhardness | 62 |

Example 3

About 100 parts of the polyester from Example 1 are reacted as in that example, with about 30.3 parts diphenylmethane-4,4'-diisocyanate. A solution of about 30.8 parts of 1,4-cyclohexane dihydroxybutyric acid amide (M.P. 280° C.) in about 200 parts dimethylformamide is added to the melt and the solution is left to react for about 60 minutes at about 80° C. After diluting the reaction solution, which has become viscous, with about 135 parts of dimethylformamide, the reaction is taken to completion at about 60° C. A film is cast from the highly viscous 30% elastomer solution. The foil obtained after drying at about 70° C. to about 100° C. has the following properties:

| | |
|---|---|
| Thickness (mm.) | 0.19 |
| Tear strength (kg./cm.²) | 673 |
| Elongation (percent) | 565 |
| Tension at 20% elongation (kg./cm.²) | 17 |
| Tension at 300% elongation (kg./cm.²) | 152 |
| Resistance to further tearing according to Graves (kg./cm.) | 52 |
| Microhardness | 69 |

Threads cut from this foil have the following properties:

| | |
|---|---|
| Titer (den.) | 1024 |
| Tear strength (g./den.) | 0.69 |
| Elongation (percent) | 690 |
| Tension at 300% elongation (mg./den.) | 91 |
| Tension at 150% elongation (mg./den.) | 17 |

Example 4

About 100 parts of the polyester from Example 1 are reacted, as in that example, with increasing quantities (I, II, III) of 4,4'-diphenylmethane diisocyanate at about 100° C. and then at about 80° C. with terephthalic acid dihydroxypropylamide (M.P. 202° C.) in dimethylformamide.

| | Diisocyanate | | Terephthalic acid dihydroxy propylamide | |
|---|---|---|---|---|
| | Parts | Mol | Parts | Mol |
| I | 23.3 | 1.7 | 7.65 | 0.5 |
| II | 27.4 | 2.0 | 12.2 | 0.8 |
| III | 34.2 | 2.5 | 18.4 | 1.2 |

The weights given refer to 100 parts polyester, the molecular numbers to 1.0 mol polyester.

The foils made from the 30% solutions have the following properties:

| | I | II | III |
|---|---|---|---|
| Thickness | 0.18 | 0.20 | 0.16 |
| Tear strength (kg./cm.²) | 396 | 454 | 668 |
| Elongation, percent | 620 | 670 | 460 |
| Tension at 20% elongation (kg./cm.²) | 9 | 11 | 7 |
| Tension at 300% elongation (kg./cm.²) | 43 | 85 | 206 |
| Resistance to further tearing according to Graves (kg./cm.) | 18 | 26 | 37 |
| Microhardness | 50 | 64 | 68 |

The 30% solution III, which has a viscosity of 216 p./20°, is spun through a nozzle with 10 apertures (0.12 mm. bore) into a water bath at about 90° C., and after passing through a washing path of 6 m. (water at about 90° C.) it is wound on a spool at a rate of 10 m. per minute. The thread is then after-treated in water at about 50° C. for one hour. After drying, the following properties are measured:

| | |
|---|---|
| Titer (den.) | 132 |
| Tear strength (g./den.) | 0.59 |
| Elongation (percent) | 580 |
| Tension at 300% elongation (mg./den.) | 118 |
| Tension at 150% elongation (mg./den.) | 13 |

Example 5

About 100 parts of the polyester from Example 1 are reacted, as in that example, with about 30.3 parts diphenylmethane-4,4'-diisocyanate. A solution of about 11.2 parts of hydrazodicarboxylic acid-γ-hydroxypropylamide (M.P. 235° C.) in about 100 parts of dimethylformamide and about 100 parts of dimethylsulphoxide is added to the melt and the solution is left to react for about 5 minutes at about 80° C. After diluting the reaction solution which has become viscous, with about 180 parts of dimethylformamide and cooling to about 60° C., the reaction is stopped after a further 30 minutes by the addition of about 10 parts of a 10% diisobutylamine solution in dimethylformamide.

Films are cast from the highly viscous 26.5% elastomer solution. The foil obtained after drying at about 70° C. to about 100° C. has the following properties:

| | |
|---|---|
| Thickness (mm.) | 0.13 |
| Tear strength (kg./cm.²) | 416 |
| Elongation (percent) | 480 |
| Tension at 20% elongation (kg./cm.²) | 41 |
| Tension at 300% elongation (kg./cm.²) | 206 |
| Resistance to further tearing according to Graves (kg./cm.) | 36 |
| Microhardness | 62 |

If the melt is treated with a solution of about 12.6 parts of hydrazodicarboxylic acid-γ-hydroxybutylamide (M.P. 221° C.) in about 200 parts of dimethylformamide as described above, an elastomer solution is obtained from which foils having the following properties can be produced:

| | |
|---|---|
| Thickness (mm.) | 0.17 |
| Tear strength (kg./cm.²) | 372 |
| Elongation (percent) | 500 |
| Tension at 20% elongation (kg./cm.²) | 29 |
| Tension at 300% elongation (kg./cm.²) | 146 |
| Resistance to further tearing according to Graves (kg./cm.) | 38 |
| Microhardness | 72 |

The hydrazodicarboxylic acid hydroxyalkylamides obtained by the action of hydrazodicarboxylic acid phenyl ester (M.P. 144° C.), dissolved in glycol monomethyl ether, on alkanolamines at about 50° C. to about 60° C. The products are obtained in a crystalline form, separated by suction filtration, washed with alcohol and dried. In this form, they are sufficiently pure to serve as chain lengthening agents in the manner described.

It is of course to be understood that the examples specifically recited herein are for the purpose of illustration and not limitation and that any of the specific reactants set forth throughout the specification such as the active hydrogen compound, organic isocyanates or the chain-extenders may be used in place of those specifically used herein.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:
1. Film and fiber forming polyurethane polymers prepared by the process which comprises reacting in a highly polar solvent that will dissolve acrylonitrile, an organic diisocyanate with a substantially linear organic compound containing active hydrogen atoms which are reactive with NCO groups, said compound having a molecular weight of from about 500 to about 5,000 and a chain extending agent having a melting point of at least about 160° C. and a formula selected from the group consisting of

(I) HO—$R_1$—CO—NH—R—NH—CO—$R_1$—OH
(II) HO—$R_1$—NH—CO—R—CO—NH—$R_1$—OH
(III) HO—$R_1$—NH—CO—NH—CO—NH—$R_1$—OH
(IV) HO—$CH_2$—$CH_2$—NH—CO—CO—NH—$CH_2$—$CH_2$—OH
(V) HO—$CH_2$—$CH_2$—$CH_2$—HN—CO—CO—NH—$CH_2$—$CH_2$—$CH_2$—OH wherein R is a divalent organic radical selected from the group consisting of aliphatic, hydroaromatic, arylaliphatic and aromatic, and $R_1$ is a divalent radical selected from the group consisting of aliphatic, hydroaromatic and araliphatic where the hydroxyl is attached to the aliphatic portion.

2. The film and fiber forming polyurethane polymers of claim 1 wherein the chain extending agent is represented by the Formula I.

3. The film and fiber forming polyurethane polymers of claim 1 wherein the chain extending agent is represented by the Formula II.

4. The film and fiber forming polyurethane polymers of claim 1 wherein the chain extending agent is represented by the Formula III.

5. The film and fiber forming polyurethane polymers of claim 1 wherein the chain extending agent is represented by the Formula IV.

6. The film and fiber forming polyurethane polymers of claim 1 wherein the organic compound containing active hydrogen atoms is selected from the group consisting of dihydroxyl polyesters, polyalkylene ether glycols, dihydric polythioethers and dihydric polyacetals.

7. The film and fiber forming polyurethane polymers of claim 1 wherein the chain extending agent is selected from the group consisting of oxalic acid dihydroxyethylamide, oxalic acid dihydroxypropylamide, 1,4-cyclohexane dihydroxybutyric acid amide, terephthalic acid dihydroxypropylamide, hydrazodicarboxylic acid-γ-hydroxypropylamide and hydrazodicarboxylic acid-γ-hydroxybutylamide.

8. The film and fiber forming polyurethane polymers of claim 1 wherein the organic compound containing active hydrogen atoms and having a molecular weight of from about 500 to about 5,000 and the organic diisocyanate are reacted in the first step to prepare an NCO terminated prepolymer and this NCO terminated prepolymer is reacted in a second step in a highly polar solvent that will dissolve acrylonitrile with the chain extending agents of claim 1.

References Cited

UNITED STATES PATENTS

| | | | |
|---|---|---|---|
| 3,294,751 | 12/1966 | Beitchman | 260—77.5 |
| 3,305,533 | 3/1967 | Thoma et al. | 260—77.5 |
| 2,284,637 | 6/1942 | Catlin | 260—77.5 |
| 2,284,896 | 6/1942 | Hanford et al. | 260—77.5 |
| 3,054,755 | 9/1962 | Windemuth et al. | 260—77.5 |

FOREIGN PATENTS 955,995  1/1957  Germany.

DONALD E. CZAJA, *Primary Examiner.*

H. S. COCKERAM, G. W. RAUCHFUSS,
*Assistant Examiners.*